3,271,159
FEED COMPOSITIONS CONTAINING SODIUM N-GLYCOLYLARSANILATE AND METHOD OF USE
Emery W. Dennis and Aaron Arnold, Albany, N.Y., assignors to Sterling Drug Inc., New York, N.Y., a corporation of Delaware
No Drawing. Filed Mar. 26, 1962, Ser. No. 182,647
10 Claims. (Cl. 99—2)

This invention pertains to the art of veterinary science, and specifically relates to compositions and methods for promoting the growth, for improving feed conversion, and also for improving the appearance of certain domestic animals, particularly poultry and swine.

Of the large number of organic arsenic compounds (arsenicals) which are known, only a very few have been found to have the properties of promoting the growth, improving the feed conversion, and improving the appearance of poultry and swine when administered over extended periods of time, which effects are highly desirable, especially in respect to poultry and swine which are raised primarily for human consumption. In general, oral medication with arsenicals lead to an increase of the tissue levels of arsenic in excess of amounts normally present. It has been suspected in the art that all ingested arsenicals leave residues of trivalent inorganic arsenic in the animal tissues, and in view of the relatively high degree of toxicity of trivalent inorganic arsenic in the form of arsenious acid, the practice has been to withdraw the arsenic-medicated feed from the animals so treated for several days prior to slaughter. The withdrawal allows the excess arsenic which has accumulated in the tissues of the animal to be excreted, thus lowering the arsenic concentration in the tissues to normal safe levels. Great care has been required to ascertain that the arsenic content of the tissues has indeed been lowered to a predetermined level.

It is an object of this invention to provide an arsenic-containing feed composition for promoting the growth and improving the outward appearance of poultry and swine safely, and, in particular, without leaving toxic levels of trivalent inorganic arsenic in the tissues of the animals.

We have now discovered that the particular objects set forth hereinabove can be accomplished by orally administering to the poultry and swine novel feed compositions containing an effective growth-promoting and appearance-improving quantity of sodium N-glycolylarsanilate.

POULTRY

Insofar as the invention relates to poultry, said feed compositions comprise a poultry feed having dispersed therein as an effective growth-promoting, appearance-improving, and feed conversion-improving ingredient sodium N-glycolylarsanilate.

A feed composition which provides optimum effects of improved rate of growth, improved feed conversion and improved appearance in poultry can best be obtained from a feed composition comprising from about 20 to about 40 grams of sodium N-glycolylarsanilate per ton of feed (about 0.002 to 0.004 percent by weight). We generally prefer to employ a feed composition which contains about 0.003 percent by weight of sodium N-glycolylarsanilate.

The compound sodium N-glycolylarsanilate employed in this inveniton is old and can be prepared, for example, starting with p-nitroaniline, by the following steps: (1) acylating p-nitroaniline with glycolic acid, (2) reducing the resulting p-nitroglycolylanilide with, for instance, hydrogen over a suitable catalyst; (3) diazotizing the resulting p-aminoglycolylanilide, (4) reacting the resulting p-glycoylylaminobenzenediazonium chloride with arsenious acid, and (5) neutralizing the resulting N-glycolyl-arsanilic acid with sodium hydroxide.

Any of the common poultry feeds can be employed as the basic nutrient of the feed compositions comprising our invention. The common poultry feeds generally contain ground grains and various other ingredients, such as vitamins, minerals, powdered milk, meat or protein-substitute, and the like.

Feed compositions containing the sodium N-glycolylarsanilate in any desired amount can be prepared by mechanically mixing the arsenical in finely ground form with the feed or by dispersing a solution of sodium N-glycolylarsanilate in a suitable solvent, for example water, in the feed and either removing the solvent or allowing it to remain in the feed. The feed composition can be prepared either for direct use by mixing 0.002 to 0.004 percent of sodium N-glycolylarsanilate by weight with the feed; or, if desired, a concentrated medicated pre-mix feed can be obtained by using a considerably larger proportion of sodium N-glycolylarsanilate, for example 1 to 10 percent by weight, which is suitable for subsequent blending with a larger amount of either the same or a different poultry feed to arrive at the desired concentrations of sodium N-glycolylarsanilate for feeding.

Administration of the medicated feeds herein described is preferably begun immediately after the poultry are hatched and maintained during the entire growing period of the birds. By adjusting the concentration of sodium N-glycolylarsanilate in the feed compositions to the levels described above, an effective dose of the arsenical is ingested by the birds in consuming their normal daily ration of food. The medicament can also be administered in the drinking water of the poultry; and, if desired, a sweetening agent such as sugar can be added to increase the palatability of the solution.

When young poultry are fed the feed compositions herein described for 8–10 weeks, their final weight is significantly greater than the weight of control poultry given identical food except that sodium N-glycolylarsanilate is excluded.

The outward appearance of the poultry is improved as a result of the administration of sodium N-glycolylarsanilate-containing feed compositions. Specifically, the improvements include an improved sheen and smoothness of the feathers, a deepening of the red color of the comb and wattles, and a deepening of the pigmentation of the shank and of the skin of the legs.

Administration of the feed compositions herein described to poultry also results in improved feed conversion. The feed conversion ratio is the number of weight units of feed necessary to yield one weight unit of body weight; hence, a feed having a minimum feed conversion ratio is desirable. The feed compositions herein described produce an economically significant lowering of the feed conversion ratio over controls, as demonstrated in Example I, below.

The tissues of poultry which have been maintained on the feed compositions herein described contain no detectable arsenic in the objectionable trivalent form. The small quantities of residual arsenical which can be found in the tissues, and in particular, the liver, are exclusively in the relatively non-toxic pentavalent form.

Various other medicaments can be added to the feed compositions; for example, the broad-spectrum antibiotics such as penicillin, bacitracin, erythromycin, streptomycin, and the tetracyclines, for example tetracycline, oxytetracycline and chlortetracycline act as growth-promoting agents per se and enhance the growth-promoting effects of the subject feed-arsenical compositions. In addition, anti-coccidial drugs and other therapeutic and prophylactic medicaments can be administered in combination with the feed compositions herein described.

SWINE

Insofar as it relates to swing feed compositions, the invention comprises swine feeds which contain as an effective growth-promoting ingredient sodium N-glycolylarsanilate.

Swine feeds which contain from about 15 to about 45 grams of sodium N-glycolylarsanilate per ton of feed (about 0.0015 to about 0.0045 percent) are useful for promoting the growth and for improving the feed conversion of young pigs.

The swine feed compositions of this invention are prepared and used in the same manner as that described above for poultry feed compositions. Swine feed compositions comprising as growth-promoting ingredients not only sodium N-glycolylarsanilate, but also any of the broad spectrum antibiotics described above are particularly useful for improving the rate of growth of young pigs.

In addition to the sodium salt of N-glycolylarsanilic acid, which is described herein as the preferred medicament, other physiologically acceptable salts of N-glycolylarsanilic acid, regarded by the inventors as the full equivalents of the sodium salt, are useful for the purposes set forth above.

The following examples will further illustrate the invention without the latter being limited thereto.

Example I

Four lots of White Van Tress X Nichols 108 straight run chicks containing 120 chicks per lot were fed basic poultry feed containing a commercial coccidiostat consisting of 50 percent bithionol [2,2'-thiobis(4,6-dichlorophenol)], 10 percent methiotriazamine [4,6-diamino-1-1(4-methylmercaptophenyyl)-1,2-dihydro-2,2-dimethyl-1,3,5-triazine hydrochloride] and 40 percent calcium sulfate. Sodium N-glycolylarsanilate in the amount of thirty grams per ton of feed was added to the diet of two of the four lots and the remaining two lots were maintained as controls. After eight weeks, the average weight of the medicated birds was 1393 g., while the average weight of the untreated birds was 1304 g. The feed conversion of the treated birds was 1.86, and of the untreated birds, 1.70.

The chickens receiving the arsenic-medicated feed had an improved appearance over the control chickens. Specifically the treated chickens showed an improved sheen and smoothness of the feathers, a deepening of the red color of the comb and wattles, and a deepening of the pigmentation of the shank and of the skin of the legs.

In order to determine the safety of the feed compositions which we have described above, we sacrificed chickens which had been administered said feeds for eight weeks. We found that the tissues of the treated chickens contained no arsenic compounds in the objectionable trivalent form. Small quantities of arsenicals were found in the tissues, and in particular, in the liver, but the arsenic therein was exclusively in the relatively non-toxic pentavalent form. By experiment we found that the tissues of chickens given a five-day withdrawal period contained virtually no arsenical residues; however, in view of the absence of detectable inorganic residual arsenic, even when no withdrawal period was used, we regard such withdrawal unnecessary.

Example II

To one ton of basal swine growing feed is added 30 grams of sodium N-glycolylarsanilate as a fine powder and the feed composition is mixed mechanically until uniform. The resulting feed composition contains about 0.003 percent sodium N-glycolylarsanilate. Newly weaned pigs weighing from about 35 to about 45 pounds each are fed the medicated feed during their entire growing period (until their individual weight is approximately 120 pounds). The swine fed the above mixture show an improved rate of growth and an improved feed conversion ratio over control swine given the same feed except that sodium N-glycolylarsanilate is excluded. In addition, the treated swine show an improved appearance, in particular, a healthier luster of the hair.

We claim:

1. A composition for promoting the growth and improving the appearance and feed conversion of poultry without leaving toxic levels of trivalent inorganic arsenic in the tissues of the animals which comprises a poultry feed having dispersed therein as an effective growth-promoting, appearance-improving, and feed conversion-improving ingredient sodium N-glycolylarsanilate.

2. A composition for promoting the growth and improving the appearance and feed conversion, of poultry without leaving toxic levels of trivalent inorganic arsenic in the tissues of the animals which comprises a poultry feed having dispersed therein as an effective growth-promoting and appearance- and feed conversion-improving ingredient sodium N-glycolylarsanilate in the amount of from 20 to 40 grams per ton of feed.

3. A composition for promoting the growth, improving the feed conversion, and improving the appearance of poultry without leaving toxic levels of trivalent inorganic arsenic in the tissues of the animals which comprises a poultry feed having dispersed therein as an effective growth-promoting and appearance-improving ingredient sodium N-glycolylarsanilate in the amount of about 0.003 percent by weight of the composition.

4. The method of promoting the growth, improving the feed conversion, and improving the appearince of poultry without leaving toxic levels of trivalent inorganic arsenic in the tissues of the animals which comprises orally administering to poultry an effective growth-promoting and appearance- and feed conversion-improving quantity of sodium N-glycolylarsanilate.

5. The method of promoting the growth and improving the appearance and feed conversion of poultry without leaving toxic levels of trivalent inorganic arsenic in the tissues of the animals which comprises feeding the poultry a composition comprising a poultry feed having dispersed therein as an effective growth-promoting and appearance- and feed conversion-improving ingredient sodium N-glycolylarsanilate in the amount of 20 to 40 grams per ton of feed.

6. The method of promoting the growth and improving the appearance of poultry without leaving toxic levels of trivalent inorganic arsenic in the tissues of the animals which comprises feeding the poultry a composition comprising poultry feed having dispersed therein as an effective growth-promoting and appearance-improving ingredient about 0.003 percent by weight of sodium N-glycolylarsanilate.

7. A composition for promoting the growth of swine without leaving toxic levels of trivalent inorganic arsenic in the tissues of the animals which comprises a swine feed having dispersed therein as an effective growth-promoting ingredient sodium N-glycolylarsanilate.

8. A composition for promoting the growth of swine without leaving toxic levels of trivalent inorganic arsenic in the tissues of the animals which comprises a swine feed having dispersed therein as an effective growth-promoting ingredient sodium N-glycolylarsanilate in the amount of from 15 to 45 grams per ton of feed.

9. The method of promoting the growth of swine without leaving toxic levels of trivalent inorganic arsenic in the tissues of the animals which comprises orally administering to the swine an effective growth-promoting quantity of sodium N-glycolylarsanilate.

10. The method of promoting the growth of swine without leaving toxic levels of trivalent inorganic arsenic in the tissues of the animals which comprises feeding the swine a composition comprising swine feed having dispersed therein as an effective growth promoting ingredient sodium N-glycolylarsanilate in the amount of 15 to 45 grams per ton of feed.

References Cited by the Examiner

UNITED STATES PATENTS

| | | | |
|---|---|---|---|
| 1,988,758 | 1/1935 | Streitwolf et al. | 99—2 |
| 2,450,866 | 10/1948 | Morehouse et al. | |
| 2,809,112 | 10/1957 | Anderson et al. | 99—4 |

OTHER REFERENCES

McChesney et al., Toxicity and Physiological Disposition of Sodium p-N-Glycolylarsanilic, Toxicology and Applied Pharmacology, vol. 4, No. 1, pp. 14–23, January 1962.

Morrison, Feeds and Feeding, pp. 953–4, 22nd ed., The Morrison Publishing Co., Ithaca, N.Y. (1957).

A. LOUIS MONACELL, *Primary Examiner.*

D. DONOVAN, *Assistant Examiner.*